US012586028B2

(12) United States Patent
Doran et al.

(10) Patent No.: US 12,586,028 B2
(45) Date of Patent: Mar. 24, 2026

(54) METHOD AND SYSTEM FOR MANAGING INVENTORY

(71) Applicant: Trade Capital Corporation, Menlo Park, CA (US)

(72) Inventors: Michael C. Doran, Menlo Park, CA (US); Sanjay Bonde, Menlo Park, CA (US); Shiva Sandy, Reno, NV (US)

(73) Assignee: Trade Capital Corporation, Menlo Park, CA (US)

( * ) Notice: Subject to any disclaimer, the term of this patent is extended or adjusted under 35 U.S.C. 154(b) by 246 days.

(21) Appl. No.: 17/990,340

(22) Filed: Nov. 18, 2022

(65) Prior Publication Data

US 2023/0169455 A1    Jun. 1, 2023
US 2023/0368132 A9    Nov. 16, 2023

Related U.S. Application Data

(60) Provisional application No. 63/320,339, filed on Mar. 16, 2022, provisional application No. 63/311,975, filed on Feb. 19, 2022, provisional application No. 63/281,472, filed on Nov. 19, 2021.

(51) Int. Cl.
   *G06Q 10/087*       (2023.01)
(52) U.S. Cl.
   CPC .................................. *G06Q 10/087* (2013.01)
(58) Field of Classification Search
   CPC ................................................... G06Q 10/087
   USPC ......................................................... 705/28
   See application file for complete search history.

(56) References Cited

U.S. PATENT DOCUMENTS

| | | | |
|---|---|---|---|
| 6,167,385 A | 12/2000 | Hartley-Urquhart | |
| 11,173,404 B1 | 11/2021 | Koch | |
| 2004/0143504 A1 | 7/2004 | Tsai | |
| 2005/0209934 A1 | 9/2005 | Irby et al. | |
| 2006/0064344 A1* | 3/2006 | Lidow ................... | G06Q 10/06 |
| | | | 705/7.31 |
| 2006/0253393 A1* | 11/2006 | Bean ...................... | G06Q 30/00 |
| | | | 705/40 |
| 2016/0092829 A1* | 3/2016 | Jones ................... | G06Q 10/087 |
| | | | 705/28 |
| 2019/0164223 A1 | 5/2019 | De Jong | |
| 2020/0034860 A1 | 1/2020 | Willis | |
| 2020/0074389 A1 | 3/2020 | Mohammad | |
| 2020/0175623 A1* | 6/2020 | Howie ................... | G06Q 50/18 |
| 2020/0211092 A1 | 7/2020 | Sarin | |

(Continued)

OTHER PUBLICATIONS

Grunen, Jan. Digitalization Technologies and Business Trends in Procurement. Universitaet Mannheim (Germany) ProQuest Dissertations & Theses, 2021. (Year: 2021).*

(Continued)

*Primary Examiner* — Fawaad Haider
(74) *Attorney, Agent, or Firm* — Potomac Law Group, PLLC; Marc S. Kaufman

(57)       ABSTRACT

Systems and methods of managing inventory include a hybrid distributed computing system and database for recording title to the inventory in a third party after the inventory has been delivered to a location accessible to a producer (e.g., a user of the inventory). The cost and accounting of the inventory can then be managed separately from the physical possession of the inventory. The producer may then access and take title to the inventory on demand (as needed).

14 Claims, 4 Drawing Sheets

(56)        References Cited

U.S. PATENT DOCUMENTS

2020/0311657 A1 *  10/2020  Pace ................. G06Q 30/0631
2020/0364420 A1     11/2020  McCormick et al.
2021/0304122 A1      9/2021  Dattamajumdar et al.

OTHER PUBLICATIONS

Wang, Qiping et al. Blockchain-Enabled Smart Contracts for Enhancing Distributor-to-Consumer Transactions. IEEE Consumer Electronics Magazine, vol. 8, Issue 6, 2019. (Year: 2019).*
International Search Report and Written Opinion of the International Searching Authority for PCT Application No. PCT/IB2023/055990 dated Aug. 28, 2023, 11 pages.
International Preliminary Report on Patentability issued in PCT Patent Application No. PCT/US2022/050440, dated May 2, 2024.
International Serach Report and Written Opinion issued in PCT Patent Application No. PCT/US2022/050440, dated Feb. 21, 2023.
Casino, et al., "Enhanced Vendor-managed Inventory through Blockchain", 2019 4th South-East Europe Design Automation, Computer Engineering, Computer Networks and Social Media Conference (SEEDA-CECNSM), IEEE, Sep. 20, 2019, 8 pages.
Extended European Search Report at the European Patent Office issued in European Patent Application No. 22896542.2-1218 / 4433972 PCT/US2022050440, dated Aug. 20, 2025.

* cited by examiner

METHOD AND SYSTEM FOR MANAGING INVENTORY

RELATED APPLICATION DATA

This application claims benefit of U.S. Provisional Application Ser. No. 63/320,339 filed Mar. 16, 2022, 63/311,975 filed Feb. 19, 2022, and 63/281,472 filed on Nov. 19, 2021, the entire disclosure of which is incorporated herein by reference.

BACKGROUND

Holding inventory, such as physical goods, represents an undesirable financial burden. However, even companies practicing "just in time" inventories require some inventory on hand. Accordingly, manufacturers and other users of inventory must balance the need for having inventory on hand against the adverse impact on a company's financial standing and its balance sheet. OEMs, Suppliers and Contract Manufacturers try to push inventories to each other, and it is therefore a cause of friction for effective collaboration amongst these parties.

Conventional inventory management methods include optimizing inventory levels, lead times and critical last-minute scheduling of goods delivery, such approaches minimize inventory carrying costs at the expense of greater supply chain risk and resiliency due to unreasonably lower inventory levels or delayed cashflow to suppliers.

SUMMARY OF THE INVENTION

The disclosed implementations include automated systems and methods of managing inventory whereby title to inventory (e.g., physical goods, virtual assets, or digital assets) needed by a producer (i.e. an entity desiring to modify, sell, distribute, or otherwise use the inventory) is recorded as being held by a third-party entity that is not the supplier of the goods or the producer, while at the same time allowing the goods to be physically present at a desired location under control of the producer. Transfer of title to the producer is then automatically recorded in a database. Title can be transferred to the producer upon the occurrence of one or more specified conditions. The transfer can be accomplished using one or more smart contracts executing in a decentralized computing environment, such as a blockchain. Further, the financial transactions associated with the transfer of the inventory can be accomplished in a seamless and efficient manner.

A first aspect of the invention is an inventory management system comprising: a data storage device configured to store inventory data including a recordation of title of specific inventory and a status of the inventory; a request module configured to receive a request for the specific inventory from a producer, the request including instructions for delivery of the specific inventory to a location accessible by the producer; a purchase order (PO) generation module configured to, in response to the request for the specific inventory, generate a purchase order for purchase of the specific inventory from a supplier, wherein the purchase order specifies delivery of the specific inventory to the location accessible to the producer and wherein the purchase order species transfer of title in the specific inventory to a title holder that is an entity different from the producer; an inventory management contract module configured to generate an inventory management contract, corresponding to the specific inventory, between the producer and the title holder, the inventory management contract specifying a fee payable to the title holder for holding title to the specific inventory and conditions upon which title of the specific inventory will transfer from the title holder to the producer; an inventory tracking module configured to track the specific inventory and to update status of the specific inventory in the inventory data, the status of the specific inventory being recorded in the inventory data as conditionally on-hand inventory of the producer while title of the specific inventory is recorded in the inventory data as being held by the title holder and the status of the specific inventory being recorded in the inventory data as on hand when title in the specific inventory is recorded in the inventory data as being held by the producer; and a title transfer module configured to transfer title of the specific inventory from the title holder to the producer, in response to satisfaction of at least one condition specified in the inventory management contract, by recording title of the specific inventory in the inventory data as being held by the producer at a time after the specific inventory has been stored at the location accessible to the producer and in response to satisfaction of the at least one condition.

BRIEF DESCRIPTION OF THE DRAWINGS

The foregoing summary, as well as the following detailed description, will be better understood when read in conjunction with the appended drawings. For the purpose of illustrating the invention, there are shown in the appended drawings various illustrative implementations. It should be understood, however, that the invention is not limited to the precise arrangements and instrumentalities shown.

DETAILED DESCRIPTION

Figure 1:
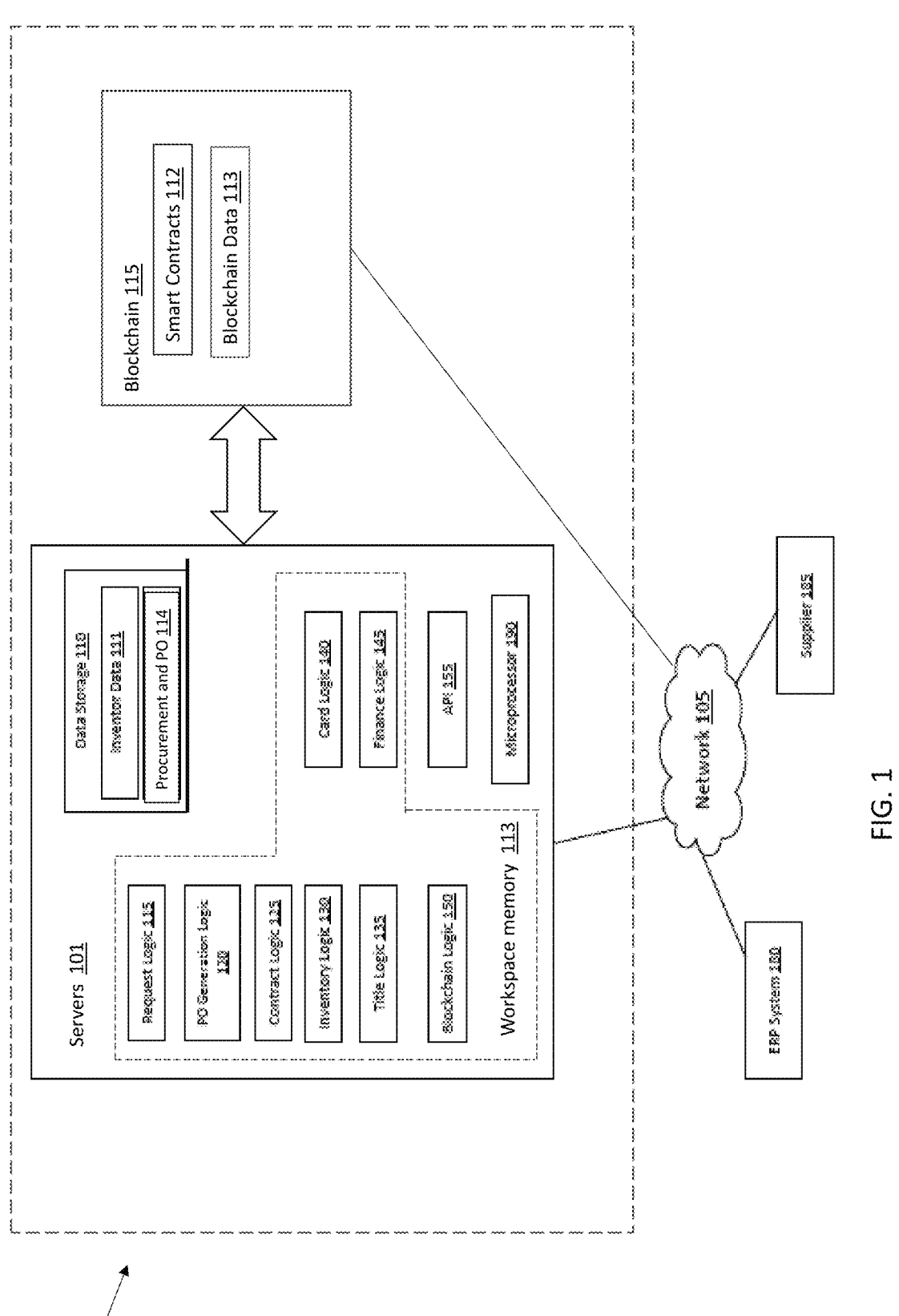
FIG. 1 is a block diagram of an architecture of an automated inventory management system in accordance with disclosed implementations.

The systems and methods disclosed herein allow for delivery of inventory, such as goods, to an area in control of a producer prior to transferring title in the inventory to the producer, thus achieving advantages of just in time inventory while avoiding many of the disadvantages of conventional inventory management methods. The disclosed implementations allow for unconstrained holding of inventories to mitigate both risks and costs. Using smart contracts executed on a decentralized computing environment, more optimal cost distribution is achieved, and risk is reduced. The novel architecture and database model of disclosed implementation allows the financial burden of carrying inventory to be separated from the inventory itself, creating a marketable and financeable derivative as a secondary advantage. Such advantages are achieved using novel inventory management logic, data models, and devices, as described in detail below.

The system and methods described herein may be used in transactions involving two, three or more parties. In an illustrative example, three parties are involved. These parties are referred to herein as a "producer," a "supplier" and a "title holder" (also referred to as the "inventory management system" or "system"). The producer is a party that receives inventory from a supplier for the purpose of using the inventory to produce additional goods, to sell goods, to provide a service, and/or otherwise consume the inventory. The supplier is a party that provides the inventory to the producer. As an example, the supplier may be an original equipment manufacturer (OEM), or an intermediate producer in a supply chain. The title holder is a party that is distinct from the producer and which holds title to inventory for a period of time after the inventory has been delivered to a location accessible to the producer and until specified conditions are met indicating that the producer is ready to use the inventory at which time the system automatically transfers title to the producer. The title holder typically takes title from the supplier. The title holder is typically a third party and may be the manager of, or a subscriber to, the inventory management system. Alternatively, the role of "title holder" can be performed by the "supplier." Accordingly, the title holder can be a party controlling the inventory management system or can be another designated party.

In an exemplary use case, the producer will determine a future need for inventory (e.g., goods), the producer will send a request for this inventory to the supplier and/or the title holder. The title holder generates a purchase order that transfers title of the inventory from the supplier to the title holder and requests that the inventory be delivered to a location accessible to the producer. When conditions indicate that the producer is ready to use the inventory, the title holder/system is notified, and the system transfers title to the producer (and can make payment for the inventory to the title holder). Notice of the conditions can be automatically generated by tracking conditions of the inventory, such as movement of the inventory from the location accessible to the producer to, for example, a production floor. The title transfer and payment can be affected by logic recorded in one or more smart contracts executing on the decentralized environment. In this process, the producer avoids taking title to the inventory until needed, while at the same time, the inventory is positioned in a convenient location under control of the producer and can be considered as "on-hand" inventory.

FIG. 1 illustrates a computer architecture of automated inventory management system 100 in accordance with disclosed implementations. Inventory Management System 100 may be embodied in a single computing device or a network of connected computing devices using software to execute the logic described herein. The logic is described herein as corresponding to "modules", i.e., code executed by one or more computer processors. The modules are segregated by function but need not correspond to any specific discrete code segment(s) and/or processor(s). Inventory Management System 100 is distinguished, in part, by elements configured for designating and transferring title to inventory separately from the physical possession of the inventory. For example, a producer may need inventory to produce a product, physical or digital, then using inventory management system 100, may take physical possession of the inventory prior to taking title to the inventory. Title is optionally held by a third party title holder until the inventory is needed to be utilized by the producer.

Inventory management system 100 includes server(s) 101 having data storage 110. Data storage 110 is configured to store at least inventory data 111 (described in more detail below). Procurement and purchase order data 114, indicating various procurement information, sales information, pricing, libraries of goods and specifications, maximum and minimum future sales dates and/or the like, can also be stored in data storage 110. Inventory management system 100 also includes a decentralized network, blockchain 115 in this implementation. Blockchain 115 has smart contracts 112 stored thereon for execution. Blockchain 115 also stores and blockchain data 113, such as transaction data described below. Executable computer code, representing any of the executable logic/modules discussed herein can be stored in workspace memory 113 of server(s) 101.

Inventory data 111 applies a novel data model that distinguishes between on-hand inventory in which the producer has title and on-hand inventory in which the producer does not have title but for which the producer has future rights and obligations. Inventory in which the producer does not have title but for which the producer has future rights and obligations is referred to herein as "conditionally on-hand" inventory. The storage of the inventory data 111 or the logic may be stored on premise or may be on cloud or on distributed computing systems operating together in unison or under a common command structure. Further, inventory data 111 can be stored on blockchain 115 as part of blockchain data 113. Inventory data 111 may be expanded and/or updated over time based on the occurrence of events or transactions associated with inventory and stored accordingly for ease of retrieval.

In some implementations, the data is further enhanced by the capabilities of intelligent process automation to learn and preconfigure repetitive tasks, e.g., automated or non-automated tagging. In some implementations, the data stored in data storage 110 and/or blockchain 115 is optionally collected over 5G+ networks using IOT devices to offer near real time data and inventory tracking. In some implementations, data storage 110 is further enhanced by the capabilities of big data management to analyze trends and offer predictions, outliers and other relevant inferences for the management of inventories and title and manage cyber security risks, e.g., the addition of master data and/or metadata elements targeted to enrich and enhance the capabilities of the data storage 110.

Request logic module 115 is configured to receive a request for immediate or future acceptance of specific inventory, such as designated physical goods, from a producer under a master contract. This request can include any combination of quantity, date, price and terms, specifications, shipping conditions, and/or delivery of the inventory to a location accessible to the producer. The master contract can be a legal contract and can have a logical corollary recorded as one of smart contracts 112. Such requests for specific inventory may be sent and received electronically or physically. The location accessible to the producer can be a physically secured location or container, optionally monitored by an access device configured to detect access to the inventory and to communicate this access to title logic module 155 disclosed in detail below. Title logic module 155 can be configured to generate access credentials to the physically secured location or container.

As used herein "location accessible to the producer" refers to a location from which the producer can readily retrieve inventory, e.g., a warehouse or container in control of the producer and proximate to a manufacturing facility at which the inventory is consumed. The location accessible to the producer can be a location owned and operated by the producer or by a contracted party holding physical custody of the inventory on behalf of the producer. For example, a location accessible to a producer may be a warehouse from which the producer can retrieve truckloads or pallets of inventory during a day's production run. The location accessible to a producer may be located on a production floor. A location accessible to a producer is generally more conveniently accessible to the producer than an original source of the inventory. Inventory is stored at the location accessible to the producer while it is recorded as conditionally on-hand until needed by the producer at which time the inventory can be recorded as on-hand.

In some implementations, request logic 115 is further configured to generate specifications of terms of a purchase of the inventory, including any combination of: a quantity, a part number, a price, payment terms, an interest rate, a fee for holding title to the inventory, an identifier of the location accessible to the producer, and a maximum holding period in which the title holder will hold title to the inventory. These specifications can be used in one or more of smart contracts 112, to control ownership of the inventory based on various conditions in the manner set for the below.

In some implementations, request logic 115 is further enhanced by the capabilities of intelligent process automation to learn and preconfigure repetitive tasks, e.g., forecasting and auto population of purchase or sales orders, detection of outliers and alerts thereto, and population of recommendations. In some implementations, request logic 115 is configured to assure that the request for inventory includes terms and conditions allowed or required by the supplier on a pre-agreed basis pursuant to contract logic 125 below. The terms and conditions can be enforced by one or more of smart contracts 112.

In some implementations, request logic 115 is further enhanced by the capabilities of quantum computing for the purpose of handle operations at speeds substantially higher than conventional computers. Request logic 115 can be executed by a cloud computing platform for the purpose of offering, amongst other benefits, scalability back-up and restore functions, improved collaboration, accessibility, lower maintenance cost, high response, use of mobility devices, services in a pay-per-use model, substantial data storage capacity and data security. Request logic 115 can be configured to allow users to make requests using their mobile devices. This implementation will leverage PO generation logic 120 and inventory card logic 140 (described below) to facilitate secure encrypted transactions with inherent limits.

As noted above, generally, the three parties involved in purchase order generation are (a) producer; (b) title holder or prospective title holder; and (c) supplier. Purchase order (PO) generation logic 120 is configured for use by a prospective title holder to automatically import, from a producer, requisite purchasing and contractual data necessary to generate a purchase order for purchase of the inventory from a supplier based on producer requests received from Request logic 115 and enforced by one or more of smart contracts 112 for further execution. The purchase order can require delivery of the inventory to the location accessible to the producer; and/or automatic pre-population of purchase order information by usage of data from producers ERP system 180 and strategic procurement systems. In some implementations, PO generation logic 120 automatically uploads and updates 3PL and shipping contracts associated with a PO for tracking of physical inventories from dispatch by a supplier 185 until future purchase by producer, onto blockchain logic 150, which provides a node on blockchain 115. Producers, suppliers, title holders and other parties can also execute a node on blockchain 115 to share various data. PO generation logic 120 can be further enhanced by the capabilities of intelligent process automation to learn and preconfigure repetitive tasks, e.g., forecasting and auto population of purchase or sales orders, detection of outliers, and intelligent recommendations.

In some implementations, the purchase order requires payment for the inventory to be made by the title holder to the supplier on terms imported from producer requests into a smart contract which designates the title holder as owner of the inventory as of delivery or shipment of the inventory to the location accessible by the producer. Wherein a first right for purchase of the inventory by the producer is granted and recorded. After issuance of the purchase order, associated data is stored in the data storage 110 and/or as blockchain data 113 with further addition of data related to financing of the inventory purchase and recording of insurances, liens, and rights related to return of inventory to suppliers.

Contract logic 125 is configured to generate an inventory management contract between the producer and the title holder. The inventory management contract can specify terms, including a fee for holding title to the inventory and a designation of the location accessible to the producer. The inventory management contract can be enforced by one or more of smart contracts 112 executed on blockchain 115 automatically in response to satisfaction of a condition, for example, passage of a designated maximum hold time for which the title holder is required to hold title to the inventory, the producer accessing the location accessible to the producer, removal of the inventory from the location accessible to the producer, and/or receipt of a purchase order for the inventory.

In some implementations, contract logic 125 is further configured to execute an insurance contract configured to assure that the producer will perform under the contract. Contract logic 125 can specify liens, UCC registrations, cost allocations, rights and responsibilities for safeguarding of inventory and purchase terms including but not limited to pricing, payment currency including crypto currency and other terms agreed by the producer for future purchase of the inventory as set in request logic 115. Optionally, contract terms can be enforced by one or more of smart contracts 112.

Contract logic 125 can also be configured to generate an Inventory Handling and Safekeeping Contract (IHSC) between the titleholder and producer or producer's designee to manage inventories on behalf of title holder for a fee. The IHSC can specify service terms including producer's obligations, fees for managing inventories pursuant to any service level agreements, and obligations of the producer on reporting on inventory status, real-time or otherwise, and all data associated with inventory pursuant to request logic 115.

Inventory logic 130 can be configured to track inventory on-hand, real-time or otherwise, for the producer and to update the inventory data, the specific inventory being listed as conditionally on-hand inventory of the producer while title of the inventory is held by the title holder. In some implementations, inventory logic 130 is configured to specify first right of use of conditionally on-hand inventory by producer and store the same on blockchain logic module 115 and blockchain data 113. Inventory logic module 130 can be further enhanced by the capabilities of intelligent process automation to learn and preconfigure repetitive tasks e.g. forecasting and auto population of purchase or sales orders, detection of outliers, intelligent recommendations. Inventory logic module 130 can also be further enhanced by the capabilities of human augmentation to automatically collect data related to any physical movement of inventories, e.g., forecasting and auto population of purchase or sales orders, detection of outliers and alerts thereto, and population of recommendations.

In some implementations, Inventory logic 130 is executed over 5G+ networks using IOT devices to offer near real time data tracking, e.g., forecasting and auto population of purchase or sales orders, detection of outliers and alerts thereto, and population of recommendations. Further, inventory logic 130 can be configured to change a designation of inventory from conditionally on-hand to on-hand responsive to the transfer of title of the inventory. This change can be recorded as a transaction on blockchain 115. Inventory logic 130 may be inserted onto smart contracts and associated blockchains to host contract logic 125 and execute PO Generation logic 120. Inventory logic 130 can be configured to allow for system generated alerts to be generated and communicated to users.

Title logic 135 is configured to transfer title of the inventory from the title holder to the producer at some time after the inventory have been stored at the location accessible to the producer, the title transfer being initiated in response to satisfaction of a condition, e.g., a pull order received from the producer or an automated sales order issued by the title holder. The title transfer can be performed according to the inventory logic 130, and request logic 115. Title logic 135 can be configured to process payment terms for the inventory from the producer to the title holder, optionally automatically according to the inventory management contract commonly called a vender managed inventory contract, automatic filing of UCC filings, related changes in security interests and liens, producer's rights for return of inventory, automatic confirmation of amounts due and payable by the producer. In some implementations, title logic 135 is executed over 5G+ networks using IOT devices to offer near real time data tracking optionally using Intelligent Process Automation, RFID tags, and/or other software to track physical movement of inventory.

Card logic 150 is configured to allow financial purchasing power to purchasing agents of the requester, individually or in aggregate, based on an overall financial limit set by the title holder in contrast to a credit card, where a user can immediately purchase assets against which a liability is simultaneously created, or a debit card where a user can purchase by simultaneous use of a current cash or other asset balance. Inventory card logic 130 is configured to distribute multiple inventory purchasing inventory cards associated with a master financial account to a number of purchasing agents, each Inventory card representing the limits on purchases that can be made by each of the purchasing agents. Inventory card logic 130 can capture financial considerations associated with the purchase of the inventory, title, asset values and description, related obligations and liabilities associated with specific contract terms and/or limits and generate automated reports and statements thereof at set period of time indicating balances outstanding and settled. Further, inventory card logic 130 can also generate a physical/digital label for the inventory at the location of the requester. The physical label for the inventory can be configured for placement at the location accessible to the producer, the physical label optionally including a printed label or an electronic label, and any combination of the title holder of the inventory, an identifier of the inventory, a use-by date for the inventory, a description of the inventory, and an inventory entry for the inventory. Inventory card logic 130 can be configured to associate a physical or virtual card with the inventory, the inventory card optionally being associated with a specific inventory management contract and/or purchasing agent. The inventory card can be associated with specific contract terms and/or limits. Inventory card logic 130 is optionally configured to set the fee for holding the inventory based on a level of risk associated with the producer, and optionally configured to calculate a credit rating for a particular purchase of inventory. In some implementations, inventory card logic 130 is configured to generate and/or distribute the inventory cards responsive to a master contract between the producer and the title holder pursuant to contract logic 125.

Finance logic 145 is configured to receive offers to fund purchase of the inventory by the title holder and executed by inventory card logic 140 pursuant to contract logic 125. In some implementations, finance logic 145 is configured to accept the offers to fund purchase of the inventory, optionally from among multiple offers, and is optionally configured to bundle interests in fees charged for holding title to inventory for sale to investors. Further, finance logic 145 can be configured to accept all currencies, including cryptocurrencies and fiat currencies, to enable purchase of the inventory, optionally from among multiple currencies. Finance logic 145 can also be configured to bundle interest in fees charged based on variable interest rates such as LIBOR and Prime.

Finance logic 145 can be configured to accept fixed fees in lieu of variable rates and optionally providing for the reconciliation and balances due or recoverable based on such reconciliation and generate automated reports and statements thereof at set period of time indicating balances outstanding and settled as PPV. In some implementations, finance logic 145 is further enhanced by the capabilities of intelligent process automation to learn and preconfigure repetitive tasks. Finance logic 145 can be configured to associate each inventory item held against its financier and cause a lien in favor of that financier to be recorded automatically pursuant to title logic 135.

Finance logic 145 can also be configured to Increase/optimize Return on Capital Employed (ROCE), a conventional financial ratio that can be used to assess a company's profitability and capital efficiency, by reducing working capital funding or its cost by leveraging the machine learning in data storage 110 combined with the analytics of request logic 115 and the intelligence automation of inventory logic 130. In some implementations, finance logic 145 is configured to enhance/optimize liquidity by reducing working capital funding or its cost at the same level of working capital funding cost by leveraging the machine learning in data storage 110 combined with the analytics of request logic 115 and the intelligence automation of inventory logic 130. Finance logic 145 can be further configured to optimize overall cost by reducing working capital funding by leveraging the machine learning in data storage 110 combined with the analytics of request logic 115 and the intelligence automation of inventory logic 130.

Blockchain logic 150 includes node protocol software to execute a node on blockchain 115 (to interface server(s) 101 with blockchain 115) and can be configured to record ownership transfer associated with the origination of ownership of the inventory and the title transfer from the title holder to the purchaser as a transaction on blockchain 115. In some implementations, blockchain logic 150 is configured to store a record of any combination of: title to the inventory, contract terms (e.g., fees, prices, maximum hold times, currencies, payment terms), location of the inventory, and shipping data, tracking numbers, delivery events, pull requests, inventory returns, liens, financier details and all associated terms in a smart contract to enforce compliance of contractual obligations. Blockchain logic 150 can be further enhanced by the capabilities of Intelligent Process Automation to learn and preconfigure repetitive tasks. Blockchain logic 150 can be executed as part of a decentralized computing environment over cloud computing for the purpose of offering, amongst other benefits, back-up and restore functions, improved collaboration, accessibility, lower maintenance cost, use of mobility devices, services in the pay-per-use model, substantial data storage capacity and data security.

Application programing interface (API) logic 155 is configured to receive the request for inventory from an ERP (enterprise resource planning) system 180 for the use by title holder to purchase inventory pursuant to contract logic 125. Microprocessor 190 includes one or more hardware computer processor(s) configured to execute at least the instructions of all logic elements described herein. Microprocessor 190 can include electronic, optical, or quantum computing circuits.

Figure 2:
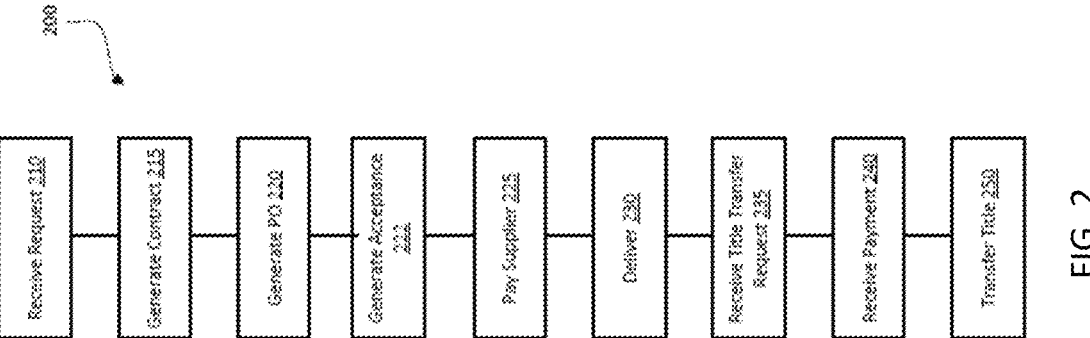
FIG. 2 is a flow chart of a method of automated inventory management in accordance with disclosed implementations.

FIG. 2 illustrates method 200 of managing title to inventory, according to various implementations of the invention. Method 200 can be accomplished by the computing environment of FIG. 1. Title holder purchases, pays for, and holds title to inventory based on purchase intents previously issued by a producer that detail specifications and terms and conditions for such purchase. Inventory may optionally be located close to a producer or contract manufacturer, and in some case collocated with them in a clearly marked and segregated location within the premises under control of the title holder. The producer or contract manufacturer has visibility to the inventory specifications and quantity available and can pull (i.e., purchase) via pull order any items from the inventory as needed to support producers manufacturing operations. Purchasers optionally issue a PO to the title holder and/or the title holder may issue a sales order to the producer for such items pulled.

All purchases of inventory items by title holder shall be pursuant to a master contract between title holder and the producer and optionally a supplier (185 of FIG. 1) from whom such items are to be purchased. Such contract shall specify the amount of inventory that may be purchased and held by title holder at any time, the list of authorized components, pricing terms and related authorized suppliers including supply locations if relevant.

A purchase order to a supplier is generated by, for example, the title holder placing a purchase order directly with the supplier stipulating that the Bill-To-Party (the party to be billed) shall be the title holder, and listing the item(s), quantity(s), price, ship-to-location, shipping incoterms, shipping date. Confirmation and change orders prior to order fulfillment and shipment shall be negotiated directly between the title holder with the Supplier based on terms agreed between the producer and the supplier. Title holder shall relay the received notifications to the producer and vice versa.

A Supplier Advanced Ship Notices (ASN) shall be relayed to and made visible to the title holder, the producer, and any logistics provider(s). To achieve this visibility, the supplier sends the ASN to the logistics provider who then forwards a copy to title holder or the supplier sends the ASN to the title holder who then forwards a copy to logistics company and the producer. Verification of receipt of inventory shall be conducted by the title holder or its agent who could be the logistics provider or the producer. Such agent will certify that inventory is received in good condition and that the ASN details are accurate. Release of payment to supplier by the title holder shall be conducted thereafter upon agreed terms and conditions.

Conditions, such as a Pull of inventory shall trigger an invoice from the title holder to the producer and inventory shall be depleted in the title holders accounting records and an appropriate amount receivable from the producer shall be recorded. IN other words, title of the specific is transferred to the producer and the status of the changed from conditionally on-hand to on-hand. Thereafter the producer will make payment to title holder on agreed terms.

Referring to FIG. 2, at step 210 a request is configured in producer's IT systems to issue automated procurement instructions, i.e., requests, for certain inventory from the title holder at a prescribed date and simultaneously log all transaction details over block chain logic 150 and report the same to data storage 110. Such requests may be altered by the producer on pre-agreed terms and optionally issue a fresh set of instructions.

At step 215 a contract is generated between the producer and a title holder, the contract specifying any combination of the following: that the title holder will hold title to the inventory until a request or notice for the inventory is received by the title holder from the producer, a maximum hold time is reached, the producer accesses the inventory and optionally will purchase the inventory from the title holder in the future, terms(i.e., a specified condition is satisfied), conditions, purchase obligations associated with the future purchase obligation of the producer, automated sales, transfers, scrapping and return rights. Such contract details can be recorded on block chain logic 150 and/or data storage 110. The title holder may optionally issue the producer and/or its agents an inventory card setting privileges to the producer and/or its agents the ability to issue, to a title holder, procurement intents for inventory.

At step 220, a purchase order for the inventory is generated and transmitted to a specified supplier of the inventory together with inventory specifications based on step 210. The purchase order is optionally generated by the title holder and delivered to the supplier. The PO is optionally automatically generated and configured in title holders IT systems to replicate procurement instructions from producer for certain inventory or materials and simultaneously logged over block chain logic 150 and report onto data storage 110. The purchase order is typically subject to the terms of the contract generated in step 215.

At step 222, the inventory is accepted upon meeting specifications set in step 220, or rejected if they do not meet the specifications. An acceptance or rejection order can be transmitted to a supplier of the inventory and simultaneously recorded as a transaction on blockchain 115, by block chain logic 150, and/or data storage 110. Verification of inventory can be conducted by the title holder or its agent who could be the logistics provider or the producer.

At step 225, title holder or its agent will certify that inventory is received in good condition and that the ASN details are accurate, and payment will be released to the supplier by the title holder thereafter upon agreed terms and conditions. Optionally this may be affected by generating a wire instruction or any other form of payment instructions to the title-holders bank for the payment of inventory ordered by title-holder pursuant to step 225, transmitting or supplying the payment instruction based on inventory acceptance at step 222 and simultaneously recording the same on blockchain 150 and/or transmitted to data storage 110.

At step 230, the title holder may receive title to the inventory upon shipment by the supplier or on acceptance of delivery according to the terms and conditions prescribed in the purchase order or as set in a purchase contract. For example, the condition triggering the title transfer may be that the inventory is moved to a location accessible to the producer upon completion of step 222. This step can include generating an inventory warehouse label with title holder's details labeled for distinguishing between producer-owned (on-hand) and title holder owned (conditionally on-hand)

inventory and simultaneously recording the label as a transaction on blockchain 115 and/or data storage 110.

At step 235, the title holder receives a request to transfer title of the inventory to the producer, optionally while the inventory is located in the location accessible to the producer or the producer is in physical possession of the inventory. For example, the producer may request title to the (conditionally on-hand) inventory that they intend to use on a particular day or a particular production run. In some implementations, a title transfer request is automatically generated by detection of removal of the inventory from the secure location accessible to the producer. For example, inventory may be detected as having been removed visually or using a tracking technology such as RFID or barcodes.

The producer has visibility to the inventory specifications and quantity available and can pull (i.e., purchase) via pull order any items from the inventory as needed to support producers manufacturing operations. Optionally this may be affected by configuring a Pull Ordering System in producers ERP or IT system for ordering of inventory or materials from title holder over an inventory replacement system that is used by to replenish their inventory levels and simultaneously recorded on block chain logic 150 and/or data storage 110.

At step 240, the title holder receives payment from the producer for purchase of the inventory from the title holder on terms set in producers purchase order, which can include a fee for holding title to the inventory. This can be simultaneously recorded as a transaction on block chain logic 150 and/or data storage 110. At step 250, the producer or CM pull of inventory triggers an invoice from the title holder to the producer or CM and inventory is depleted in the title holders accounting records transferring title of the inventory to the producer. Simultaneously, based on the pre-agreed terms of sale, an amount receivable from the producer is recorded. Thus, completing the transfer of title to the inventory from the title holder to the producer.

Figure 3:
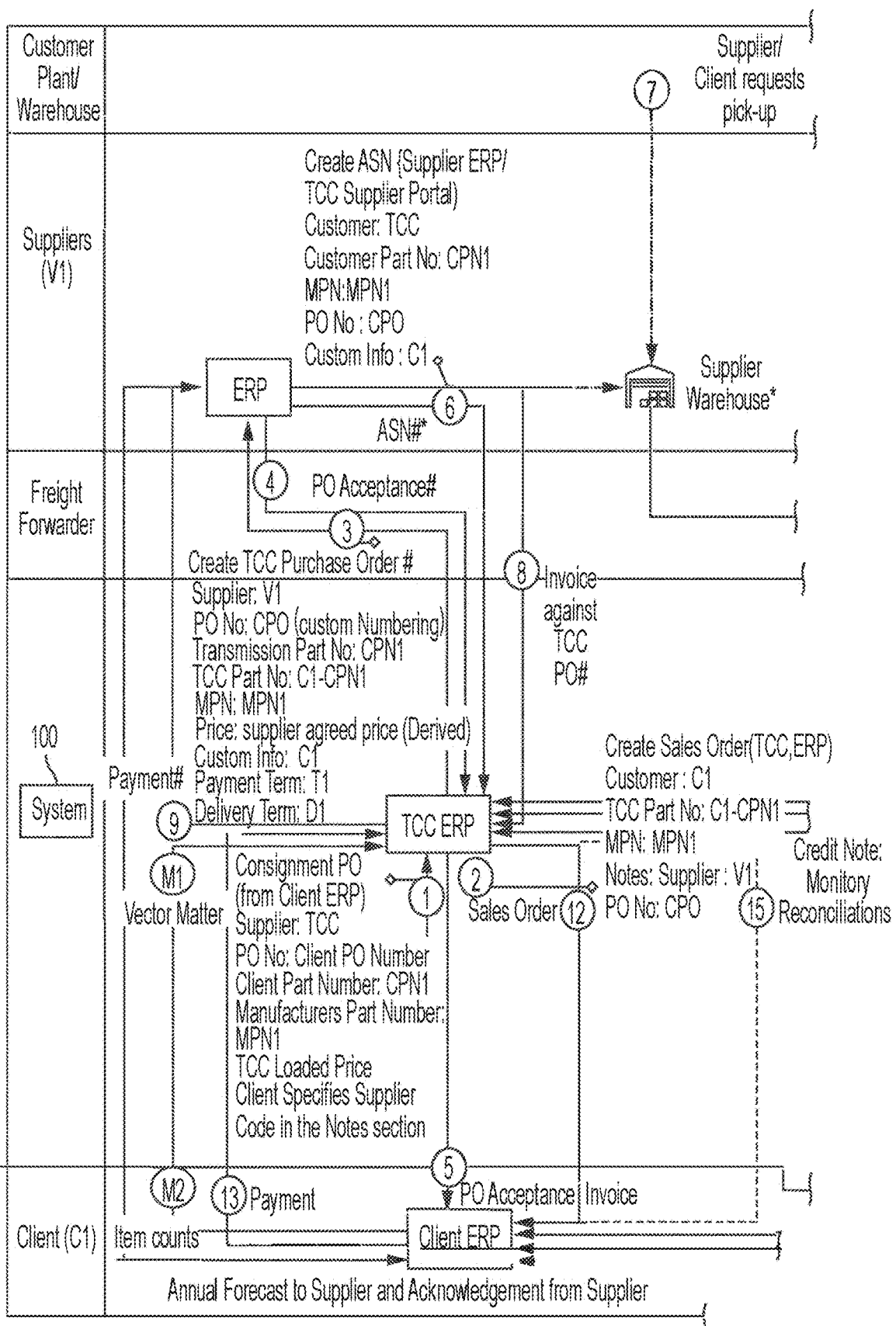
FIG. 3. is a flow diagram of documents and goods in accordance with an example of disclosed implementations.
Figure 3:
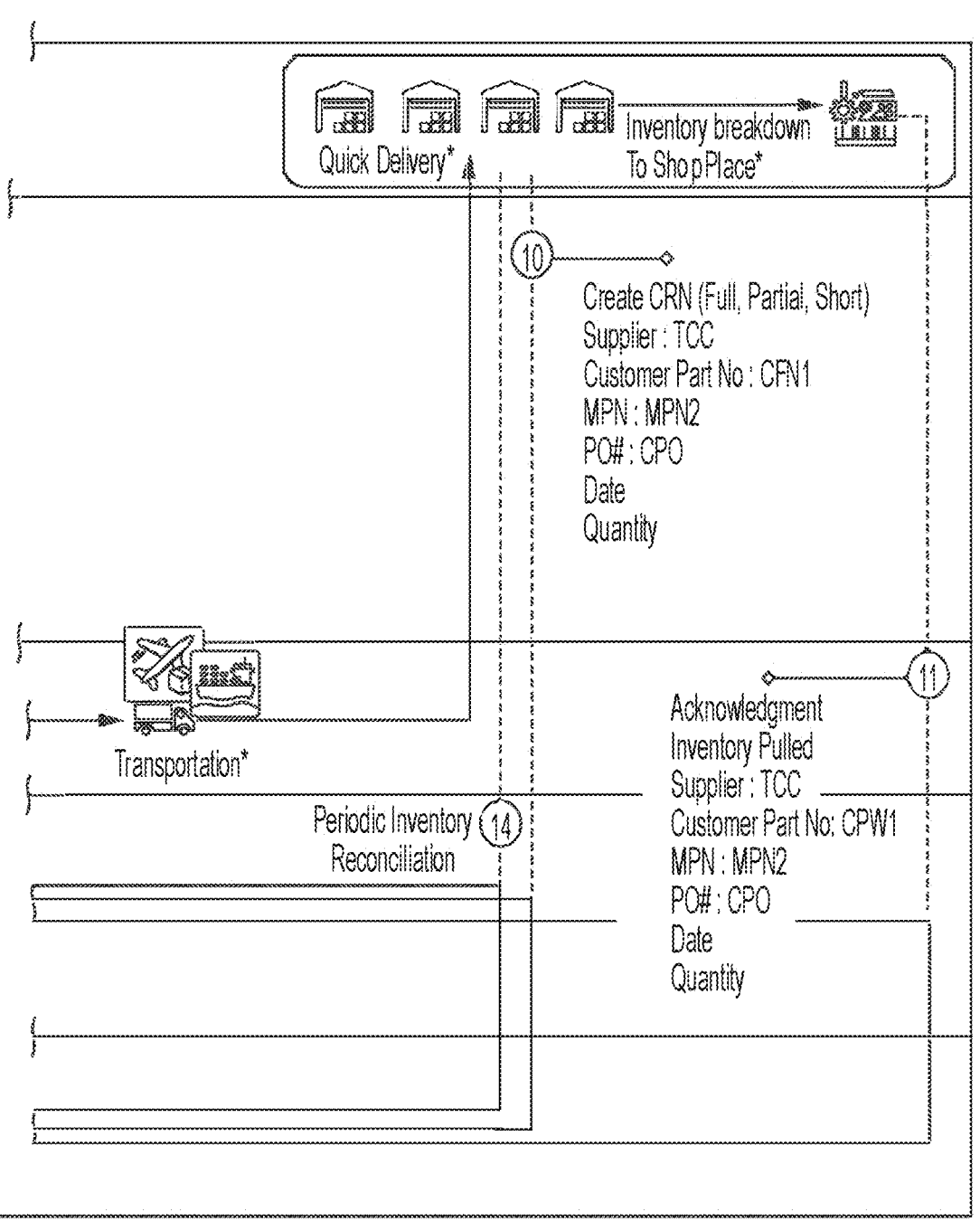

FIG. 3 illustrates the flow of inventory and transaction documents in greater detail in accordance with an example of disclosed implementations. Table 1 below describes the workflow at each labeled step of FIG. 3. In FIG. 3, an asterisk (*) indicates a track and trace point for collecting and reporting data to the appropriate parties and a hash mark (#) indicates that a supplier communication is shared with the client/customer. Further, M1 and M2 of FIG. 3 are master data documents representing ongoing vendor information, inventory information, agreed supplier price and system 100 marked up price synced between an ERP of system 100 and the client.

TABLE 1

| Step | Document | Description |
|---|---|---|
| 1 | Consignment PO | The client issues a consignment PO to System 100 (FIG. 1). The consignment PO specifies the supplier of the inventory along with other material information, such as delivery schedule and location, and business terms between the client and system 100. The item price is considered as system 100 "loaded" price which will be reflected on final invoice (see below) from system 100 which will be paid by the client. PO data, and other data herein, can be shared with system 100 through any conventional channel such as email, a Supplier Portal, EDI or flat file exchange. Alternatively, any information can be conveyed to relevant parties by being recorded on the blockchain of system 100 and made available to blockchain nodes of the parties. |
| 2 | Sales Order | A sales order is generated in the by system 100 based on the information in the consignment PO. The specific inventory is a unique item in system 100. For example, the inventory can be tokenized and recorded on the blockchain of system 100. |
| 3 | Purchase Order | Based on the sales order a final PO is created and sent to the designated supplier. The client PO number of the consignment PO can be maintained as final PO number. The item price is reflected as the agreed price between the client and the supplier. |
| 4 | PO Acceptance | The supplier conveys acceptance of the final purchase order. Any changes to delivery quantity or dates (if any) are recorded in the blockchain or other data storage of system 100. |
| 5 | PO Acceptance | Transparent visibility of the "agreed" supplier schedule is provided by system 100 to the client. |
| 6 | ASN | Once the material is ready for shipment, the supplier provides Advance Shipment Notification (ASN) to system 100. And this is made available to the client. |
| 7 | Supplier Shipment | The supplier requests the client transportation provider for the material pick-up. The material is picked up by the transporter. Inventory title is recorded as owned by system 100 at this time until sometime in the future when specified conditions are satisfied. System 100 captures "Track & Trace" information from the transporter and provides visibility thereof to the client. |
| 8 | Supplier Invoice | The supplier submits an invoice to system 100 which is recorded in system 100 |
| 9 | Supplier Payment | Based on the agreed payment terms between the client and supplier, system 100 issues payment to the supplier which is recorded in system 100. |
| 10 | Material Receipt | Material receipt at the client warehouse is recorded by the client and the storage location information is shared with system 100. |

TABLE 1-continued

| Step | Document | Description |
|------|----------|-------------|
| 11 | Inventory Drawdown | The client pulls the inventory from the consigned location for consumption and the system 100 is notified. Assuming that this is the condition precedent for transfer of ownership, inventory title is recorded as being to the client, i.e. the title to the inventory is transferred to the client. |
| 12 | Customer Invoice | Inventory pulled by the client is eligible for invoicing. The system 100 generates a customer invoice shares the same with the client. |
| 13 | Payment | Based on the agreed terms the client issues the payment to system 100 which are recorded in the system 100. |
| 14 | Inventory Reconciliation | Periodically, inventory at the client location under title of system 100 are physically verified and reconciled in system 100. Adjustments are recorded and reconciled with the client. |
| 15 | Credit note | A variance report is generated on a periodic basis and a credit note is issued by the system 100 to the client for any purchase price variance (PPV). |

Several implementations are specifically illustrated and/or described herein. However, it will be appreciated that modifications and variations are covered by the above teachings and within the scope of the appended claims without departing from the spirit and intended scope thereof. For example, while the term "producer" is used herein as a way of example, this term is meant to include any holder of inventory/materials used to manufacture inventory. It is further intended to include a user, assembler, producer, packager, and/or modifier of inventory. For example, the term producer may apply to a party that assembles or modifies parts produced by others, or that consumes good for the provision of a service. The term "producer" may apply to an airline that uses inventory assets (e.g., aircraft and crew and aviation fuel) to provide a transport service. Further, the systems and methods described herein may be applied to any holder of inventory and/or resources for the purposes of manufacture, sale and/or distribution of inventory to other parties; or providers of services requiring inventory or assets. The systems and methods discussed herein may further be applied to sub-assemblies of parts. For example, a producer may produce a sub-assembly and transfer title of the sub-assembly until the sub-assembly is need for further assembly or use, at which time title is transferred back. In this case the producer may also take the role of a supplier. In some implementations, the systems and methods described herein are used by more than three parties in a supply chain. For example, a first supplier may provide inventory to a first producer who is a second supplier to a second producer. The first producer/second supplier uses inventory received from the first supplier to produce inventory that are then passed on to the second producer for use. In such situations, title may be held by a title holder though more than one step in the supply chain, e.g., the first producer may not ever take title in the inventory provided by the first supplier and title only transferred from the title holder upon use of the (possibly improved inventory) by the second producer.

The implementations discussed herein are illustrative of the present invention. As these implementations of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the implementations illustrated.

Computing systems and/or logic referred to herein can comprise an integrated circuit, a microprocessor, a personal computer, a server, a distributed computing system, a communication device, a network device, or the like, and various combinations of the same. A computing system or logic may also comprise volatile and/or non-volatile memory such as random-access memory (RAM), dynamic random access memory (DRAM), static random access memory (SRAM), magnetic media, optical media, nano-media, a hard drive, a compact disk, a digital versatile disc (DVD), optical circuits, and/or other devices configured for storing analog or digital information, such as in a database. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The "logic" discussed herein is explicitly defined to include hardware, firmware or software stored on a non-transient computer readable medium, or any combinations thereof. The stored logic in combination with the processor is segregated herein to define functional "modules" for the purpose of description. However, each module does not necessarily correspond to discrete portions of code. This logic may be implemented in an electronic and/or digital device (e.g., a circuit) to produce a special purpose computing system. Any of the systems discussed herein optionally include a microprocessor, including electronic and/or optical circuits, configured to execute any combination of the logic discussed herein. The methods discussed herein optionally include execution of the logic by said microprocessor.

It will be appreciated by those skilled in the art that changes could be made to the implementations described above without departing from the broad inventive concept thereof. It is understood, therefore, that this invention is not limited to the implementations disclosed, but it is intended to cover modifications within the spirit and scope of the present invention as defined by the appended claims.

What is claimed:

1. An inventory management system comprising:
at least one centralized network computer server including;
    a blockchain interface module configured to provide a node on a blockchain network;
    a request module executing on a computing device configured to receive a request for the specific inventory from a remote producer computing device over a computing network, the request including instructions for delivery of the specific inventory to a location accessible by the producer, wherein the specific inventory is at least one of physical inventory and/or digital inventory, wherein the request module includes an application programing interface (API) configured to receive the request for specific inventory from an Enterprise Resource Planning (ERP) system associated with the remote producer and wherein the request for specific inventory is initiated by a Pull Ordering System of the ERP System associated with the remote producer which also records the request for specific inventory on the blockchain network;
    a purchase order (PO) generation module executing on a computing device configured to, in response to receiving the request for the specific inventory over a computing network, generate a purchase order for purchase of the specific inventory from a supplier, wherein the purchase order is a data structure that specifies delivery of the specific inventory to the location accessible to the producer and transfer of title in the specific inventory to a title holder that is an entity different from the producer;
    an inventory management contract module executing on a computing device configured to generate an inventory management contract, corresponding to the specific inventory, between the producer and the title holder,
    an inventory tracking module executing on a computing device configured to track the specific inventory and to update status of the specific inventory in inventory data by transmitting and receiving updated inventory status data through the blockchain interface module, the status of the specific inventory being recorded in the inventory data as conditionally on-hand inventory of the producer while title of the specific inventory is recorded in the inventory data as being held by the title holder and the status of the specific inventory being recorded in the inventory data as on hand when title in the specific inventory is recorded in the inventory data as being held by the producer;
    a title transfer module executing on a computing device configured to transfer title of the specific inventory from the title holder to the producer, in response to receiving condition data over a computing network, wherein said condition data indicates satisfaction of at least one condition specified in the inventory management contract, by transmitting and receiving updated inventory and status data of the specific inventory to the ledger through the interface module, the updated title data indicating the specific inventory as being held by the producer at a time after the specific inventory has been stored at the location accessible to the producer and in response to satisfaction of the at least one condition;
    a contract module configured to generate an Inventory Handling and Safekeeping Contract (IHSC) between the titleholder and producer or producer's designee to manage inventories on behalf of title holder for a fee, the IHSC specifying service terms including producer's obligations, fees for managing inventories pursuant to any service level agreements, and obligations of the producer on reporting on inventory status; and
    a forecasting module for predicting future orders and inventory needs;
a blockchain network including;
    a data storage including the decentralized ledger configured to receive the inventory data through the blockchain interface module and store the inventory data including a recordation of title of specific inventory and a status of the inventory; and
    a smart contract executing on the blockchain network, in communication with the contract module through blockchain module, wherein the smart contact specifies a fee payable to the title holder for holding title to the specific inventory and at least one condition upon which title of the specific inventory will transfer from the title holder to the producer, wherein the inventory management contract includes code designating the at least one condition as, at least one of passage of a designated maximum hold time for which the title holder is required to hold title to the specific inventory, the producer accessing the location accessible to the producer, removal of the specific inventory from the location accessible to the producer, and/or receipt of a request for the specific inventory from the producer; and;
    at least one other participant node on the blockchain network which provides the inventory data to the associated participants, wherein the participants include at least one of a producer, a supplier, and a title.

2. The system of claim 1, further comprising a card module configured to generate a physical or digital label for the specific inventory at the location of the requester.

3. The system of claim 1, further comprising a finance module configured to receive offers to fund purchase of the specific inventory by the title holder.

4. The system of claim 1, wherein the interface includes an application programing interface (API) configured to receive the request for specific inventory from an enterprise resource planning (ERP) system.

5. The system of claim 1, wherein the request module is further configured to specify terms of a purchase of the specific inventory, the terms including any combination of: a quantity, a part number, a price, payment terms, an interest rate, a fee for holding title to the specific inventory, an identifier of the location accessible to the producer, and a maximum holding period in which the title holder will hold title to the specific inventory.

6. The system of claim 1, wherein the purchase order requires payment for the specific inventory to be made from the system as title holder to the supplier and designates the system as title holder as of delivery or shipment of the specific inventory.

7. The system of claim 1, wherein the location accessible to the producer is a physically secured location or container monitored by an access device configured to detect access to the specific inventory and to communicate this access to the title transfer module, and wherein the title transfer module is configured to generate access credentials to the physically secured location or container.

8. A method for managing inventory comprising:

providing a blockchain interface module configured to provide a node on a blockchain network;

receiving, by a request module a request for the specific inventory from a remote producer computing device over a centralized computing network, the request including instructions for delivery of the specific inventory to a location accessible by the producer, wherein the specific inventory is at least one of physical inventory and/or digital inventory, wherein the request module includes an application programing interface (API) configured to receive the request for specific inventory from an Enterprise Resource Planning (ERP) system associated with the remote producer and wherein the request for specific inventory is initiated by a Pull Ordering System of the ERP System associated with the remote producer which also records the request for specific inventory on the blockchain network;

generating a purchase order (PO) in response to receiving the request for the specific inventory, for purchase of the specific inventory from a supplier, wherein the purchase order is a data structure that specifies delivery of the specific inventory to the location accessible to the producer and specifies transfer of title in the specific inventory to a title holder that is an entity different from the producer;

generating an inventory management contract, corresponding to the specific inventory, between the producer and the title holder;

tracking the specific inventory and to update status of the specific inventory in the inventory data by transmitting and receiving updated inventory status data through the blockchain interface module, the status of the specific inventory being recorded in the inventory data as conditionally on-hand inventory of the producer while title of the specific inventory is recorded in the inventory data as being held by the title holder and the status of the specific inventory being recorded in the inventory data as on hand when title in the specific inventory is recorded in the inventory data as being held by the producer;

transferring title of the specific inventory from the title holder to the producer, in response to receiving condition data over a computing network, wherein said condition data indicates satisfaction of at least one condition specified in the inventory management contract, by transmitting and receiving updated inventory and status data of the specific inventory in the inventory data to the ledger through the interface module, the updated title data indicating the specific inventory as being held by the producer at a time after the specific inventory has been stored at the location accessible to the producer and in response to satisfaction of the at least one condition;

generating an Inventory Handling and Safekeeping Contract (IHSC) between the titleholder and producer or producer's designee to manage inventories on behalf of title holder for a fee, the IHSC specifying service terms including producer's obligations, fees for managing inventories pursuant to any service level agreements, and obligations of the producer on reporting on inventory status; and providing a forecasting module configured to predict future orders and inventory needs providing, on a blockchain network, a data storage including a decentralized ledger configured to receive the inventory data through the blockchain interface module and store the inventory data including a recordation of title of specific inventory and a status of the inventory; and providing, on the blockchain network, a smart contract in communication with the contract module through blockchain module, wherein the smart contact specifies a fee payable to the title holder for holding title to the specific inventory and at least one condition upon which title of the specific inventory will transfer from the title holder to the producer, wherein the inventory management contract includes code designating the at least one condition as, at least one of passage of a designated maximum hold time for which the title holder is required to hold title to the specific inventory, the producer accessing the location accessible to the producer, removal of the specific inventory from the location accessible to the producer, and/or receipt of a request for the specific inventory from the producer; and;

providing at least one other participant node on the blockchain network which provides the inventory data to the associated participants, wherein the participants include at least one of a producer, a supplier, and a title.

9. The method of claim 8, further comprising generating a physical or digital label for the specific inventory at the location of the requester.

10. The method of claim 8, further comprising receiving offers to fund purchase of the specific inventory by the title holder.

11. The method of claim 8, wherein the interface includes an application programing interface (API) configured to receive the request for specific inventory from an enterprise resource planning (ERP) system.

12. The method of claim 8, wherein the request module is further configured to specify terms of a purchase of the specific inventory, the terms including any combination of: a quantity, a part number, a price, payment terms, an interest rate, a fee for holding title to the specific inventory, an identifier of the location accessible to the producer, and a maximum holding period in which the title holder will hold title to the specific inventory.

13. The method of claim 8, wherein the purchase order requires payment for the specific inventory to be made from the system as title holder to the supplier and designates the system as title holder as of delivery or shipment of the specific inventory.

14. The method of claim 8, wherein the location accessible to the producer is a physically secured location or container monitored by an access device configured to detect access to the specific inventory and to communicate this access to the title transfer module, and wherein the title transfer module is configured to generate access credentials to the physically secured location or container.

* * * * *